July 29, 1952     E. A. HESTER     2,605,309

RELAY CONTROL SYSTEM

Filed April 14, 1950

WITNESSES:
Robert O. Baird
Nw. Le Groove

INVENTOR
Edgar A. Hester.
BY
Waltman
ATTORNEY

Patented July 29, 1952

2,605,309

UNITED STATES PATENT OFFICE 2,605,309

RELAY CONTROL SYSTEM

Edgar A. Hester, Pittsburgh, Pa., assignor to Westinghouse Electric Corporation, East Pittsburgh, Pa., a corporation of Pennsylvania Application April 14, 1950, Serial No. 155,818

4 Claims. (Cl. 171—97)

The invention relates to electrical distribution circuits and more specifically to automatic control of the connection and disconnection of load circuits to a distribution feeder circuit.

In the case of a feeder circuit which is energized from a substation or similar source of energy, a plurality of branch or load circuits extend therefrom to the customer's services, and the connection of these branch circuits to the feeder are controlled by circuit breakers. Although the load supplied by the branch circuits may be a varied one, under present conditions it is largely represented by motors which drive various automatic and non-automatic devices. If for any reason the substation circuit breaker is opened with all of the services or loads connected to the feeder, and the breaker remains open for half an hour, for example, all the motors connected to the feeder get set in their starting position. Reclosure of the station breaker therefore places a heavy overload on the feeder since the starting current of the motors may be from seven to ten times their running current. This excessive load will trip the substation breaker, and prevent it from remaining closed. It is then necessary to go out and cut the branch circuits from the feeder until the load is reduced to a point where the station breaker will remain closed. The branch circuits may then successively be reconnected to the feeder.

It is an object of the present invention to provide an improved relay system for controlling the connection of the branch circuits to the feeder circuit of a distribution system in such a manner that upon a failure in voltage on the feeder circuit, all of the branch circuits will be disconnected, and upon a resumption of voltage on the feeder circuit, the branch circuits are reclosed in spaced timed relation so that the total load of all of the branch circuits is gradually picked up. This avoids an undue current load through the substation breaker.

It is also an object of the invention to provide an improved voltage-responsive circuit-breaker system and an improved time-delay relay which is usable in such system.

Other objects of the invention will become apparent from the following description read in connection with the accompanying drawing, in which.

Figure 1:
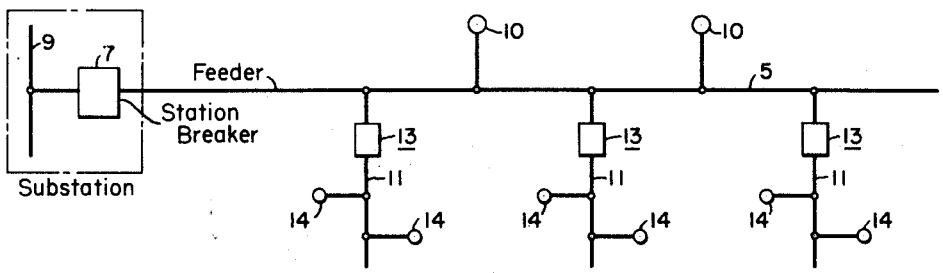
Figure 1 is a schematic view of a distribution circuit to which my invention is applicable.

Referring to Figure 1, a feeder circuit 5 is energized through a substation circuit breaker 7 which is fed from the substation bus 9. The breaker 7 is provided with overload protection in accordance with usual practice. Various loads 10 may be connected direct to the feeder circuit, and in addition there are usually a number of branch or load circuits 11 connected to the feeder 5 through circuit breakers 13. It is understood that loads 14, which may be lamps, motors or other appliances, are variously connected to the load circuits 11.

Disregarding the load circuit breakers 13, it should be apparent that if the substation breaker 7 is reclosed after it has been opened for any reason, a reenergization of all the connected load on the system will result in a substantial current surge through the substation breaker which would promptly reopen it under the influence of its overload-trip control.

Figure 2:
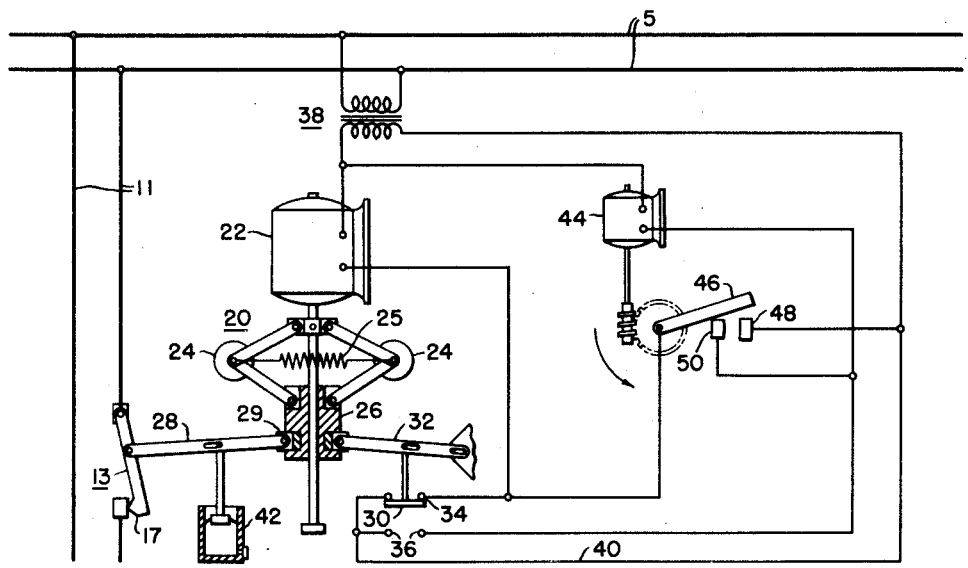
Fig. 2 is a schematic view of a circuit breaker control device and system usable in the system of my invention.

In order to avoid this difficulty, each of the circuit breakers 13 is provided with a control as indicated in Fig. 2. This comprises (schematically) a circuit breaker movable contact 17 which is operated directly by the floating end of a flyball mechanism 20, the rotation of which is controlled by a motor 22. The motor 22 may be of any size suitable for operating the flyball and contact operating mechanism. The arrangement is such that when the motor 22 is in operation the flyballs 24 will be extended to the position shown in Fig. 2, with the lower end 26 of the flyball assembly in a raised position and the link 28 maintaining the circuit breaker contact 17 in closed position. Upon deenergization of the motor 22, the flyballs 24 retract, under the influence of a spring 25, if desired, with cause the dropping of the lower part 26 of the assembly and consequent movement of the link 8 to open the contact 17. The link 28 of course may be pivotally secured to a collar 29 freely rotatable with respect to the flyball portion 26.

A pallet switch 30 is operated by a link 32 to bridge a pair of contacts 34 when the motor 22 is energized, and upon the collapse of the flyball mechanism the pallet switch bridges contacts 36, for a purpose to be described.

Energization of motor 22 from the feeder circuit 5 may be obtained by means of a potential transformer 38, one side of the secondary thereof extending through the winding of the motor 22, the pallet switch contacts 34 and conductor 40 to the other side of the transformer secondary. So long, therefore, as there is voltage on the feeder 5, the motor 22 continues to rotate with the flyballs 24 in the position shown in Fig. 2, and the circuit breaker contact 17 is maintained closed. If, however, the voltage on feeder 5 fails, the motor 22 is deenergized and the flyballs 24 retract. Accordingly, the portion 26 of the flyball assembly starts to drop and carries with it the end of link 28 which opens the circuit breaker contacts 17.

The motor, of course, slows gradually and its inertia, as well as that of the flyballs, provides an inherent time-limit which can be predetermined by the construction of the parts to be such that in the event of only momentary loss of voltage on the feeder 5, the motor 22 will again be energized to bring the parts back into the position shown without opening the circuit breaker contact 17. Of course, if desired, a greater time element may be provided by using a dashpot 42 to give a longer delay to the opening of contacts 17 to take care of momentary voltage loss of greater periods of time without interruption of the load circuit.

However, upon the occurrence of a low voltage condition on the feeder which exists for a predetermined time, the breaker contact 17 will be open. The pallet switch 30—34 will open thereby breaking the circuit of the motor 22, and the pallet switch 30 will bridge its lower contacts 36.

When voltage is reestablished on the feeder 5, it is desired to reclose the breaker contact 17, and this is accomplished by means of a small timing motor 44 which operates, through suitable gearing, a contact arm 46 in the path of rotation of which is disposed a contact segment 48. The motor 44 is connected, as indicated, from one side of the transformer secondary through the winding of the motor, the lower contacts 36 of the pallet switch 30, back to the other side of the transformer secondary. The motor 44 swings the contact arm 46 in a predetermined length of time into engagement with contact segment 48 which establishes a circuit to motor 22 through the contact arm 46, segment 48. The motor 22 being reenergized causes the raising of the flyball assembly portion 26 and as it comes up to the position shown causes the closure of the circuit-breaker contact 17. In such movement the lower contacts 36 of the pallet switch 30 are opened, thereby deenergizing the timing motor 44. However, it is preferred that a second contact segment 50 be provided which establishes a circuit through the timing motor 44, the segment 50, contact arm 46, upper pallet switch contacts 34 to conductor 49 in the transformer secondary circuit. Accordingly, the timing motor will continue to operate until the arm 46 rides over segment 50, whereupon it will be deenergized with the switch arm 46 in its initial position.

Figure 3:
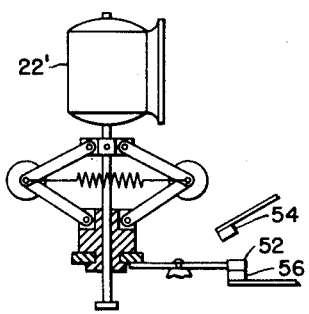
Fig. 3 is a schematic view of a time-delay voltage-responsive relay which may be used in connection with the invention.

In the above-described structure, the motor and flyball mechanism control the circuit breaker contacts directly. However, it is within the contemplation of the invention that the motor and flyball assembly may be used to control contacts 52, 54 and 56 (Fig. 3) to energize the tripping and reclosing coils of a circuit breaker. This has the advantage of permitting the use of a motor 22' of substantially smaller size and capacity than the motor 22 in Fig. 1.

It is quite apparent that modifications may be made in the system and construction shown without departing from the spirit of the invention as set forth in the appended claims.

I claim as my invention:

1. In a distribution system including a feeder circuit, a plurality of branch circuits and circuit breakers for controlling the individual connection of said branch circuits to said feeder circuit, control means for said circuit breakers including time-delayed means responsive to a drop in feeder circuit voltage of a predetermined amount and for a predetermined period to open the associated breaker, and means responsive to a return of operating voltage on said feeder to close said associated breaker with a predetermined time delay.

2. In a distribution system including a feeder circuit, a plurality of branch circuits and circuit breakers for controlling the individual connection of said branch circuits to said feeder circuit, control means for said circuit breakers including time-delayed means responsive to a drop in feeder circuit voltage to open the associated breaker after a predetermined time delay, and means responsive to a return of operating voltage on said feeder to close said associated breaker with a predetermined time delay.

3. In an electrical distribution system including a feeder circuit and a plurality of load circuits to be energized therefrom, circuit breakers for controlling the connections of said feeder and load circuits, control means for each of said breakers responsive to loss of voltage on said feeder to open said breakers with a time delay, and means for reclosing said breakers in response to reenergization of said feeder including a timing device responsive to feeder voltage for controlling such reclosure, the timing devices of the individual breakers being set to control the reclosure of the associated breaker at different time intervals.

4. In an electrical distribution system including a supply circuit, a load circuit and a circuit breaker for controlling the connection therebetween, means responsive to a loss of voltage on said feeder to open said breaker comprising an electric motor energized by said feeder and inertia means responsive to the speed of rotation thereof for opening said breaker when such speed decreases a predetermined amount.

EDGAR A. HESTER.

REFERENCES CITED

The following references are of record in the file of this patent:

UNITED STATES PATENTS

| Number | Name | Date |
| --- | --- | --- |
| 1,272,444 | Holliday | July 16, 1918 |
| 1,272,447 | Jacobs | July 16, 1918 |